United States Patent (10) Patent No.: US 12,264,108 B2
Yang et al. (45) Date of Patent: Apr. 1, 2025

(54) ZIRCONIA PARTICLES AND METHOD FOR PRODUCING ZIRCONIA PARTICLES

(71) Applicant: DIC Corporation, Tokyo (JP)

(72) Inventors: Shaowei Yang, Qingdao (CN); Minoru Tabuchi, Chiba (JP); Jianjun Yuan, Chiba (JP); Cheng Liu, Qingdao (CN); Meng Li, Qingdao (CN); Wei Zhao, Qingdao (CN); Jian Guo, Qingdao (CN)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/254,296

(22) PCT Filed: Dec. 16, 2020

(86) PCT No.: PCT/CN2020/136868
§ 371 (c)(1),
(2) Date: May 24, 2023

(87) PCT Pub. No.: WO2022/126435
PCT Pub. Date: Jun. 23, 2022

(65) Prior Publication Data
US 2024/0092699 A1 Mar. 21, 2024

(51) Int. Cl.
*C04B 35/488* (2006.01)
*C04B 35/64* (2006.01)

(52) U.S. Cl.
CPC ............ *C04B 35/488* (2013.01); *C04B 35/64* (2013.01); *C04B 2235/3246* (2013.01); *C04B 2235/3256* (2013.01); *C04B 2235/656* (2013.01); *C04B 2235/781* (2013.01); *C04B 2235/94* (2013.01); *C04B 2235/95* (2013.01)

(58) Field of Classification Search
None
See application file for complete search history.

(56) References Cited

U.S. PATENT DOCUMENTS

| | | |
|---|---|---|
| 5,336,646 A | 8/1994 | Kang et al. |
| 6,002,059 A | 12/1999 | Hellring et al. |
| 2015/0239746 A1 | 8/2015 | Yuan et al. |
| 2016/0264832 A1 | 9/2016 | Yuan et al. |
| 2019/0308883 A1 | 10/2019 | Yuan et al. |

(Continued)

FOREIGN PATENT DOCUMENTS

| | | |
|---|---|---|
| CN | 102896317 A | 1/2013 |
| CN | 104718162 A | 6/2015 |
| CN | 105658715 A | 6/2016 |

(Continued)

OTHER PUBLICATIONS

English translation of Kamei et al. (CN 109415207) (Year: 2019).*

(Continued)

*Primary Examiner* — Ronak C Patel
(74) *Attorney, Agent, or Firm* — Rimon P.C.

(57) ABSTRACT

It relates to zirconia particles containing molybdenum and each having a polyhedron shape. The molybdenum is preferably unevenly distributed in surface layers of the zirconia particles. It also relates to a method for producing the zirconia particles. The method includes mixing a zirconium compound and a molybdenum compound to form a mixture and firing the mixture.

10 Claims, 8 Drawing Sheets

Example 1

(56) References Cited

U.S. PATENT DOCUMENTS

2020/0180971 A1    6/2020   Kamei et al.

FOREIGN PATENT DOCUMENTS

| CN | 109415207 A | 3/2019 |
| CN | 110139833 A | 8/2019 |
| CN | 110237836 A | 9/2019 |
| JP | 2007106635 A | 4/2007 |
| JP | 2013075825 A | 4/2013 |

OTHER PUBLICATIONS

English translation of JP 6569830. (Year: 2019).*
International Search Report and Written Opinion issued in corresponding International Application No. PCT/CN2020/136868 dated Aug. 26, 2021 (9 pages).

* cited by examiner

Comparative Example 2

ZIRCONIA PARTICLES AND METHOD FOR PRODUCING ZIRCONIA PARTICLES

CROSS REFERENCE TO RELATED APPLICATIONS

This application is the U.S. National Phase under 35 U.S.C. § 371 of International Application No. PCT/CN2020/136868, filed on Dec. 16, 2020, the entire contents of each are hereby incorporated by reference.

TECHNICAL FIELD

The present invention relates to zirconia particles and a method for producing zirconia particles.

BACKGROUND ART

Zirconium oxide (i.e., zirconia) has many applications because of its mechanical strength, such as abrasion resistance and high toughness, and chemical stability, heat insulation, heat resistance, and high refractive index, and used in a wide range of fields, such as pigments, paints, coatings, abrasives, electronic materials, thermal insulating materials, optical materials, cosmetics, ornaments, biomaterials, and catalysts.

For example, PTL 1 discloses a method for producing a zirconia-based oxide power. The method includes: a step (a) of wet-grinding a water-containing slurry containing zirconium hydrate; a step (b) of applying a shock wave to the wet-ground slurry to dry the slurry; and a step (c) of firing the dried material.

PTL 2 discloses a method for producing a ceramic powder. The method includes: preparing a composite containing an yttria fine powder or yttrium salt uniformly dispersed in zirconium hydroxide; heating the composite in a temperature range of 1100° C. to 1400° C. to form zirconia; and grinding the zirconia to produce a ceramic powder.

CITATION LIST

Patent Literature

[PTL 1]
Japanese Unexamined Patent Application Publication No. 2007-106635
[PTL 2]
Japanese Unexamined Patent Application Publication No. 2013-075825

SUMMARY OF INVENTION

Technical Problem

The methods for producing zirconia particles disclosed in PTL 1 and PTL 2 are premised on the control of the properties of the particles through addition of a different metal, such as yttria, to a water-containing slurry containing zirconium hydrate.

However, either method does not take the hydrolysis and condensation behavior into consideration or stably control the particle shape.

An object of the present invention is to provide zirconia particles having a stably controllable shape and a method for producing the zirconia particles.

Solution to Problem

The present invention includes the following embodiments.

[1] Zirconia particles comprising molybdenum and each having a polyhedron shape.
[2] The zirconia particles described in [1], wherein the molybdenum is unevenly distributed in surface layers of the zirconia particles.
[3] The zirconia particles described in [1] or [2], wherein the zirconia particles have a [11-1] plane crystallite size of 90 nm or more.
[4] The zirconia particles described in any one of [1] to [3], wherein the zirconia particles have a median diameter $D_{50}$ of 0.1 to 1000 μm as calculated by a laser diffraction/scattering method.
[5] The zirconia particles described in any one of [1] to [4], wherein the zirconia particles have a $ZrO_2$ content ($Z_1$) of 90.0 to 99.9 mass % based on 100 mass % of the zirconia particles as determined by XRF analysis of the zirconia particles and have a $MoO_3$ content ($M_1$) of 0.1 to 5.0 mass % based on 100 mass % of the zirconia particles as determined by XRF analysis of the zirconia particles.
[6] The zirconia particles described in any one of [1] to [5], wherein the zirconia particles have a $ZrO_2$ content ($Z_2$) of 35.0 to 98.0 mass % based on 100 mass % of surface layers of the zirconia particles as determined by XPS surface analysis of the zirconia particles and have a $MoO_3$ content ($M_2$) of 2.0 to 40.0 mass % based on 100 mass % of the surface layers of the zirconia particles as determined by XPS surface analysis of the zirconia particles.
[7] The zirconia particles described in any one of [1] to [6], wherein a surface uneven distribution ratio ($M_2/M_1$) of the $MoO_3$ content ($M_2$) based on 100 mass % of surface layers of the zirconia particles as determined by XPS surface analysis of the zirconia particles to the $MoO_3$ content OM based on 100 mass % of the zirconia particles as determined by XRF analysis of the zirconia particles is from 2 to 80.
[8] The zirconia particles described in any one of [1] to [7], wherein the zirconia particles have an isoelectric point, where a potential is 0, at pH 2.0 to 6.5 as determined by zeta potential measurement.
[9] The zirconia particles described in any one of [1] to [8], wherein the zirconia particles have a specific surface area of 20 $m^2/g$ or less as determined by a BET method.
[10] The zirconia particles described in any one of [1] to [9], wherein the zirconia particles have a plane crystallite size of 90 nm or more.
[11] A method for producing the zirconia particles described in any one of [1] to [10], the method comprising: mixing a zirconium compound and a molybdenum compound to form a mixture; and firing the mixture.
[12] The method for producing the zirconia particles described in [11], wherein the molybdenum compound is molybdenum trioxide, lithium molybdate, potassium molybdate, or sodium molybdate.
[13] The method for producing the zirconia particles described in or [12], wherein a maximum firing temperature at which the mixture is fired is from 800° C. to 1600° C.

Advantageous Effects of Invention

The present invention can provide zirconia particles having a stably controllable shape and a method for producing the zirconia particles.

DESCRIPTION OF EMBODIMENTS

[Zirconia Particles]

Zirconia particles according to an embodiment contain molybdenum and each have a polyhedron shape.

The zirconia particles according to this embodiment contain molybdenum. In the method for producing zirconia particles described below, the control of the amount and state of molybdenum allows stable control of the particle shape such that the zirconia particles each have a polyhedron shape, and enables the particle size, shape, physical properties, performance, and the like of the zirconia particles to be freely adjusted according to purpose of use.

In this specification, the control of the particle shape of the zirconia particles means that the produced zirconia particles are not amorphous. In this specification, the zirconia particles having a controlled particle shape means zirconia particles having a non-amorphous particle shape.

Zirconia particles according to an embodiment produced by the production method according to the embodiment can have an idiomorphic shape specific to polyhedron shape as described below in Examples.

In this specification, the "polyhedron shape" refers to a hexahedron or a polyhedron with more faces, preferably an octahedron or a polyhedron with more faces, more preferably a decahedron to a triacontahedron.

With regard to the zirconia particles according to this embodiment, the molybdenum is preferably unevenly distributed in a surface layer of each of the zirconia particles.

The "surface layer" refers to a layer within 10 nm from the surface of each of the zirconia particles according to the embodiment. This distance corresponds to a detection depth of XPS used for measurement in Examples.

The "being unevenly distributed in a surface layer" means that the mass of molybdenum or a molybdenum compound per unit volume in the surface layer is larger than the mass of molybdenum or the molybdenum compound per unit volume in a region other than the surface layer.

In the zirconia particles according to this embodiment, the uneven distribution of molybdenum in the surface layers of the zirconia particles can be determined on the basis of the $MoO_3$ content ($M_2$) based on 100 mass % of the surface layers of the zirconia particles as determined by XPS surface analysis of the zirconia particles being larger than the $MoO_3$ content ($M_1$) based on 100 mass % of the zirconia particles as determined by XRF analysis of the zirconia particles, as described below in Examples.

The uneven distribution of molybdenum or the molybdenum compound in the surface layers results in zirconia particles having high dispersion stability compared with the distribution of molybdenum or the molybdenum compound in both the surface layers and regions (inner layers) other than the surface layers.

The [11-1] plane crystallite size of the zirconia particles according to this embodiment is preferably 90 nm or more, more preferably 95 nm or more, still more preferably 100 nm or more. The [11-1] plane crystallite size of the zirconia particles according to this embodiment may be 450 nm or less, 400 nm or less, or 350 nm or less. The [11-1] plane crystallite size of the zirconia particles according to this embodiment may be 90 nm or more and 450 nm or less, more preferably 95 nm or more and 400 nm or less, still more preferably 100 nm or more and 350 nm or less.

In this specification, the [11-1] plane crystallite size of the zirconia particles is a crystallite size calculated by using the Scherrer equation from the full width at half maximum of a peak (i.e., peak around $2\theta=28.2°$) from the [11-1] plane measured by using an X-ray diffraction method (XRD method).

The zirconia particles according to this embodiment can have a [11-1] plane crystallite size as large as 90 nm or more, can maintain high crystallinity, and are easily controlled so as to have a polyhedron shape with a large average particle size.

The plane [111] crystallite size of the zirconia particles according to this embodiment is preferably 90 nm or more, more preferably 95 nm or more, still more preferably 100 nm or more. The plane crystallite size of the zirconia particles according to this embodiment may be 450 nm or less, 400 nm or less, or 350 nm or less. The plane crystallite size of the zirconia particles according to this embodiment may be 90 nm or more and 450 nm or less, preferably 95 nm or more and 400 nm or less, more preferably 100 nm or more and 350 nm or less.

In this specification, the plane crystallite size of the zirconia particles is a crystallite size calculated by using the Scherrer equation from the full width at half maximum of a peak (i.e., peak around $2\theta=31.5°$) from the plane measured by using an X-ray diffraction method (XRD method).

The zirconia particles according to this embodiment can have a [11-1] plane crystallite size as large as 90 nm or more and a plane crystallite size as large as large as 90 nm or more, can maintain high crystallinity, and are easily controlled so as to have a polyhedron shape with a large average particle size.

The average particle size of the primary particles of the zirconia particles according to this embodiment may be 0.10 to 400 μm, 0.10 to 200 μm, 0.10 to 100 μm, or 0.10 to 50 μm.

The average particle size of the primary particles of the zirconia particles refers to an average primary particle size of at least 50 primary particles where the primary particle size means the average value of the major diameter (the maximum Feret diameter observed) and the miner diameter (short Feret diameter perpendicular to the maximum Feret diameter) of each of minimum unit particles (i.e., primary particles) that form aggregates on the two-dimensional image of the zirconia particles captured with a scanning electron microscope (SEM).

The ratio of the [11-1] plane crystallite size of the zirconia particles to the average particle size of the primary particles of the zirconia particles may be 0.01 to 1.00, 0.05 to 0.90, 0.10 to 0.80, or 0.20 to 0.60.

The median diameter $D_{50}$ of the zirconia particles according to this embodiment calculated by a laser diffraction/scattering method is preferably 0.1 to 1000 µm, preferably 0.5 to 600 µm, more preferably 1.0 to 400 µm, still more preferably 2.0 to 200 µm.

The median diameter $D_{50}$ of the zirconia particles calculated by a laser diffraction/scattering method can be determined as follows: the particle size distribution of a zirconia particle sample is measured by a dry method using a laser diffraction dry particle size distribution analyzer, and the particle size at a point where the distribution curve of cumulative volume % intersects the horizontal axis at 50% is obtained as the median diameter $D_{50}$.

The ratio of the median diameter $D_{50}$ of the zirconia particles to the average particle size of the primary particles of the zirconia particles may be 0.01 to 1.00, 0.01 to 0.80, 0.01 to 0.60, or 0.01 to 0.40.

The zirconia particles according to this embodiment preferably have a $ZrO_2$ content ($Z_1$) of 90.0 to 99.9 mass % based on 100 mass % of the zirconia particles as determined by XRF analysis of the zirconia particles and preferably have a $MoO_3$ content ($M_1$) of 0.1 to 5.0 mass % based on 100 mass % of the zirconia particles as determined by XRF analysis of the zirconia particles.

The $ZrO_2$ content ($Z_1$) and the $MoO_3$ content ($M_1$) can be measured by, for example, X-ray fluorescence (XRF) analysis using an X-ray fluorescence spectrometer (Primus IV) available from Rigaku Corporation.

The zirconia particles according to this embodiment preferably have a $ZrO_2$ content ($Z_2$) of 35.0 to 98.0 mass % based on 100 mass % of the surface layers of the zirconia particles as determined by XPS surface analysis of the zirconia particles and preferably have a $MoO_3$ content ($M_2$) of 2.0 to 40.0 mass % based on 100 mass % of the surface layers of the zirconia particles as determined by XPS surface analysis of the zirconia particles.

The zirconia particles according to this embodiment may further contain lithium, potassium, sodium, or silicon.

In the zirconia particles according to this embodiment, the surface uneven distribution ratio ($M_2/M_1$) of the $MoO_3$ content ($M_2$) based on 100 mass % of the surface layers of the zirconia particles as determined by XPS surface analysis of the zirconia particles to the $MoO_3$ content ($M_1$) based on 100 mass % of the zirconia particles as determined by XRF analysis of the zirconia particles is from 2 to 80.

The zirconia particles according to this embodiment have an isoelectric point, where the potential is zero, at more acidic pH than normal zirconia particles as determined by zeta potential measurement.

The pH of the isoelectric point of the zirconia particles according to this embodiment is, for example, in the range of 2.0 to 6.5, preferably in the range of 2.5 to 5, and more preferably in the range of 2.9 to 4. The zirconia particles having an isoelectric point in the above pH range have high electrostatic repulsion and can improve their dispersion stability by themselves when being mixed with a dispersion medium.

The specific surface area of the zirconia particles according to this embodiment as determined by a BET method may be 20 m²/g or less, 15 m²/g or less, or 10 m²/g or less.

The specific surface area of the zirconia particles according to this embodiment as determined by a BET method may be 0.01 to 20 m²/g, 0.1 to 15 m²/g, or 0.2 to 10 m²/g.

[Method for Producing Zirconia Particles]

A production method according to an embodiment is a method for producing the zirconia particles. The method includes mixing a zirconium compound and a molybdenum compound to form a mixture and firing the mixture.

A preferred method for producing the zirconia particles includes a step (mixing step) of mixing a zirconium compound and a molybdenum compound to form a mixture, and a step (firing step) of firing the mixture.

[Mixing Step]

The mixing step involves mixing a zirconium compound and a molybdenum compound to form a mixture. The contents of the mixture will be described below.

[Zirconium Compound]

The zirconium compound is any compound that may form zirconia when fired. Examples of the zirconium compound include, but are not limited to, zirconia, zirconium oxyhydroxide, and zirconium hydroxide.

[Molybdenum Compound]

The molybdenum compound is, for example, a molybdenum oxide or a molybdate compound.

Examples of the molybdenum oxide include molybdenum dioxide and molybdenum trioxide. Molybdenum trioxide is preferred.

Examples of the molybdate compound include, but are not limited to, salt compounds of molybdenum oxoanions, such as $MoO_4^{2-}$, $Mo_2O_7^{2-}$, $Mo_3O_{10}^{2-}$, $Mo_4O_{13}^{2-}$, $Mo_5O_{16}^{2-}$, $Mo_6O_{19}^{2-}$, $Mo_7O_{24}^{6-}$, and $Mo_8O_{26}^{4-}$. The molybdate compound may be an alkali metal salt, alkaline-earth metal salt, or ammonium salt of a molybdenum oxoanion.

The molybdate compound is preferably an alkali metal salt of a molybdenum oxoanion, more preferably lithium molybdate, potassium molybdate, or sodium molybdate, still more preferably potassium molybdate or sodium molybdate.

Since alkali metal salts of molybdenum oxoanions do not vaporize even in the firing temperature range and can easily be collected by washing after firing, the amount of molybdenum compound released from a firing furnace is low, and the production costs can be significantly reduced.

The molybdenum compound can contain silicon. In this case, the molybdenum compound containing silicon plays a role as both a flux and a shape control agent.

In the method for producing the zirconia particles according to this embodiment, the molybdate compound may be a hydrate.

The molybdenum compound is preferably molybdenum trioxide, lithium molybdate, potassium molybdate, or sodium molybdate, more preferably molybdenum trioxide, potassium molybdate, or sodium molybdate.

In the method for producing the zirconia particles according to this embodiment, the molybdenum compound is used as a flux. In this specification, the production method using the molybdenum compound as a flux may be referred to simply as a "flux method". In the firing, the molybdenum compound reacts with the zirconium compound at high temperature to form zirconium molybdate, and the molybdenum compound is then incorporated into the zirconia particles upon decomposition of zirconium molybdate into zirconia and molybdenum oxide at higher temperature. Molybdenum oxide sublimes and is removed from the system. In this process, the reaction between the molybdenum compound and the zirconium compound causes the molybdenum compound to form in the surface layers of the zirconia particles. With regard to the mechanism for generating the molybdenum compound contained in the zirconia particles, more specifically, the reaction between molybdenum and Zr atoms forms Mo—O—Zr in the surface layers of the zirconia particles, and firing at high temperature causes detachment of Mo and forms, for example, molybdenum oxide or a compound having a Mo—O—Zr linkage in the surface layers of the zirconia particles.

Molybdenum oxide that is not incorporated into the zirconia particles can be collected by sublimation and reused. As such, the amount of molybdenum oxide attached to the surfaces of the zirconia particles can be reduced, and the zirconia particles retain their original properties to the maximum extent.

In the production method described below in the present invention, sublimable substances are called fluxes, and non-sublimable substances are called shape control agents.

[Shape Control Agent]

To form the zirconia particles according to this embodiment, a shape control agent can be used.

The shape control agent plays an important role in zirconia crystal growth in firing the mixture in the presence of the molybdenum compound.

Examples of the shape control agent include alkali metal carbonates and silicon oxide. Specific examples include potassium carbonate, lithium carbonate, sodium carbonate, and silicon dioxide. The molybdate compound plays a role as both a flux and a shape control agent.

In the method for producing the zirconia particles according to this embodiment, the amounts of the zirconium compound and the molybdenum compound are not limited. Preferably, a mixture can be formed by mixing 35 mass % or more of the zirconium compound and 65 mass % or less of the molybdenum compound based on 100 mass % of the mixture, and the mixture can be fired. More preferably, a mixture can be formed by mixing 40 mass % or more and 99 mass % or less of the zirconium compound and 0.5 mass % or more and 60 mass % or less of the molybdenum compound based on 100 mass % of the mixture, and the mixture can be fired. Still more preferably, a mixture can be formed by mixing 45 mass % or more and 95 mass % or less of the zirconium compound and 2 mass % or more and 55 mass % or less of the molybdenum compound based on 100 mass % of the mixture, and the mixture can be fired.

In the method for producing the zirconia particles according to this embodiment, the use of these compounds in the above ranges allows the obtained zirconia particles to contain an appropriate amount of molybdenum compound and enables stable control of the particle shape. The method for producing the zirconia particles according to this embodiment can produce zirconia particles each having a polyhedron shape and having a large [11-1] plane crystallite size and a large plane crystallite size. The method for producing the zirconia particles according to this embodiment enables molybdenum to be unevenly distributed in the surface layers of the zirconia particles, can shift the pH of the isoelectric point of the zirconia particles to the acidic side, and can improve the dispersion stability of the zirconia particles when the zirconia particles are mixed with a dispersion medium.

[Firing Step]

The firing step involves firing the mixture. The zirconia particles according to the embodiment are produced by firing the mixture. This production method is called the flux method as described above.

The flux method is classified into a solution method. More specifically, the flux method is a crystal growth method using the crystal-flux binary system showing a eutectic phase diagram. The flux method is assumed to have the following mechanism. Specifically, heating a mixture of a solute and a flux causes the solute and the flux to form a liquid phase. Since the flux is a fusing agent, in other words, the solute-flux binary system shows a eutectic phase diagram, the solute melts at a temperature below the melting point of the solute to form a liquid phase. The evaporation of the flux in this state results in low flux content, that is, reduces the effect of the flux in lowering the melting point of the solute. This evaporation of the flux drives crystal growth of the solute (flux evaporation method). Cooling the liquid phase of the solute and the flux can also cause crystal growth of the solute (slow cooling method).

The flux method has advantages of, for example, crystal growth at temperature much lower than the melting point, precise control of crystal structure, and formation of idiomorphic polyhedral crystals.

The mechanism of the production of zirconia particles by the flux method using a molybdenum compound as a flux is not fully clear but is assumed, for example, as described below. Specifically, firing the zirconium compound in the presence of the molybdenum compound first forms zirconium molybdate. In this case, the zirconium molybdate allows growth of zirconia crystal at temperature lower than the melting point of zirconia as understood from the above description. Zirconium molybdate is then decomposed by, for example, flux evaporation to cause crystal growth, providing zirconia particles. In other words, the molybdenum compound functions as a flux, and zirconium molybdate is formed as an intermediate in production of zirconia particles.

The mechanism of the production of zirconia particles by the flux method further using a shape control agent is not fully clear. For example, the flux method using a potassium compound as a shape control agent is assumed to have the following mechanism. First, the molybdenum compound reacts with the zirconium compound to form zirconium molybdate. For example, zirconium molybdate decomposes into molybdenum oxide and zirconia and, at the same time, the molybdenum compound containing molybdenum oxide formed by decomposition reacts with the potassium compound to form potassium molybdate. In the presence of the molybdenum compound containing the potassium molybdate, zirconia crystal growth occurs to provide the zirconia particles according to this embodiment.

The flux method can produce zirconia particles containing molybdenum, wherein the molybdenum is unevenly distributed in surface layers of the zirconia particles.

The firing method is not limited and may be any commonly known method. At a firing temperature above 600° C., the zirconium compound reacts with the molybdenum compound to form zirconium molybdate. At a firing temperature of 800° C. or higher, zirconium molybdate $Zr(MoO_4)_2$ decomposes to form zirconia particles through the action of a shape control agent. The molybdenum compound is incorporated into the zirconia particles upon decomposition of zirconium molybdate into zirconia and molybdenum oxide.

At a firing temperature of 1000° C. or higher, the molybdenum compound (e.g., molybdenum trioxide) generated by decomposition of zirconium molybdate reacts with a potassium compound, which is used as an example shape control agent, to form potassium molybdate.

Specifically, the forms of the zirconium compound and the molybdenum compound during firing are not limited as long as these compounds are present in the same space such that the molybdenum compound can react with the zirconium compound. Specifically, the molybdenum compound and the zirconium compound may be simply mixed in the form of power, mechanically mixed by using a grinding machine or the like, or mixed by using a mortar or the like, and may be mixed in a wet state or dry state.

The conditions of the firing temperature are not limited and appropriately set according to, for example, the intended average particle size of the zirconia particles, the formation of the molybdenum compound of the zirconia particles, and the dispersibility. With regard to the firing temperature, the maximum firing temperature is normally preferably higher than or equal to 800° C. at which zirconium molybdate $Zr(MoO_4)_2$ decomposes, and more preferably higher than or equal to 900° C.

In general, to control the shape of zirconia obtained after firing, firing needs to be performed at a high temperature not lower than 2400° C. near the melting point of zirconia. However, such firing causes problems for industrial applications in terms of burden on the firing furnace and energy costs.

The production method according to the present invention can be carried out at a high temperature above 1800° C. However, at a temperature of 1600° C. or lower, which is much lower the melting point of zirconia, zirconia particles each having a polyhedron shape and having a large [11-1] plane crystallite size and a large plane crystallite size can be formed regardless of the shape of the precursor. Since the zirconia particles have molybdenum unevenly distributed in the surface layers and have an isoelectric point at more acidic pH than existing zirconia particles, the zirconia particles have high electrostatic repulsion and good dispersion stability.

According to an embodiment of the present invention, zirconia particles having good dispersion stability and having a large plane crystallite size and a large [11-1] plane crystallite size can be formed with low costs even under the condition of a maximum firing temperature of 800° C. to 1600° C. Firing at a maximum firing temperature of 850° C. to 1500° C. is more preferred, and firing at a maximum firing temperature of 900° C. to 1400° C. is most preferred.

The temperature rise rate is preferably 1 to 30° C./min, more preferably 2 to 20° C./min, still more preferably 3 to 10° C./min in terms of production efficiency and in order to reduce possibility of damage to a preparation container (crucible or saggar) from rapid thermal expansion.

With regard to the firing time, the temperature rise time up to a predetermined maximum firing temperature is in the range of 15 minutes to 10 hours, and the holding time at the predetermined maximum firing temperature is preferably in the range of 1 to 30 hours. To efficiently form the zirconia particles, the holding time at the maximum firing temperature is more preferably about 2 to 15 hours.

The zirconia particles containing molybdenum unevenly distributed in the surface layers of the zirconia particles are easily obtained by selecting the conditions of a maximum firing temperature of 800° C. to 1600° C. and a holding time of 2 to 15 hours at the maximum firing temperature.

The firing atmosphere is not limited as long as the advantageous effects of the present invention are obtained. However, the firing atmosphere is preferably an oxygen-containing atmosphere, such as air or oxygen, an inert atmosphere, such as nitrogen, argon, or carbon dioxide, and more preferably an air atmosphere to reduce costs.

The apparatus for firing is not necessarily limited and may be what is called a firing furnace. The firing furnace is preferably composed of a material unreactive with sublimed molybdenum oxide. The firing furnace is more preferably a highly sealed firing furnace in order to efficiently use molybdenum oxide.

The use of such a firing furnace can reduce the amount of molybdenum compound attached to the surfaces of the zirconia particles and allows the zirconia particles to retain their original properties to the maximum extent.

[Molybdenum Removal Step]

The method for producing the zirconia particles according to this embodiment may further include a molybdenum removal step of removing at least a portion of molybdenum as necessary after the firing step.

Since molybdenum sublimes during firing as described above, the control of the firing time, the firing temperature, and the like allows control of the molybdenum content in the surface layers of the zirconia particles and control of the molybdenum content and state in regions (inner layers) other than the surface layers of the zirconia particles.

Molybdenum may be attached to the surfaces of the zirconia particles. The molybdenum can be removed by washing with water, aqueous ammonia solution, aqueous sodium hydroxide solution, or acidic aqueous solution, instead of the sublimation. Molybdenum may not be removed from the zirconia particles, but molybdenum is preferably removed from at least the surfaces of the zirconia particles because the original properties of zirconia can be sufficiently exhibited without interference from molybdenum present on the surfaces when the zirconia particles are dispersed in a binder-based medium to be dispersed.

In this case, the molybdenum content can be controlled by appropriately changing, for example, the concentration and amount of water, aqueous ammonia solution, aqueous sodium hydroxide solution, or acidic aqueous solution used, washing sites, and washing time.

[Grinding Step]

The fired material obtained after the firing step may contain aggregated zirconia particles and may not satisfy the range of average particle size suitable for the present invention. For this, the zirconia particles may be ground so as to satisfy the range of average particle size suitable for the present invention as necessary.

The method for grinding the fired material is not limited and may be a conventionally known grinding method using, for example, a ball mill, a jaw crusher, a jet mill, a disc mill, SpectroMill, a grinder, or a mixer mill.

[Classification Step]

The zirconia particles are preferably classified in order to adjust the average particle size to improve the fluidity of powder or in order to reduce an increase in viscosity when mixed with a binder for forming a matrix. The "classification" is a process for grouping particles according to the size of the particles.

Classification may be of either wet type or dry type, but dry classification is preferred in terms of productivity.

Dry classification includes sieve classification and wind classification based on a difference between centrifugal force and fluid drag. Wind classification is preferred in terms of classification accuracy and can be performed by using a classifier, such as an airflow classifier utilizing the Coanda effect, a swirling airflow classifier, a forced vortex type centrifugal classifier, or a semi-free vortex type centrifugal classifier.

The grinding step and the classification step described above can be carried out at necessary stages. By selecting the presence or absence of grinding and classification and the conditions of grinding and classification, for example, the average particle size of the obtained zirconia particles can be adjusted.

The zirconia particles according to the present invention or the zirconia particles produced by the production method according to the present invention are preferably less aggregated or not aggregated since the zirconia particles in such a form easily exhibit their original properties and offer ease of handling and, when dispersed in a dispersion medium, have good dispersibility. The method for producing the zirconia particles eliminates the need of the grinding step and the classification step when the zirconia particles produced without the grinding step and the classification step are less aggregated or not aggregated. This improves the productivity of zirconia particles having desired properties, which is preferred.

EXAMPLES

Next, the present invention will be more specifically described by way of Examples, but the present invention is not limited to the following Examples.

Comparative Example 1

Figure 9:
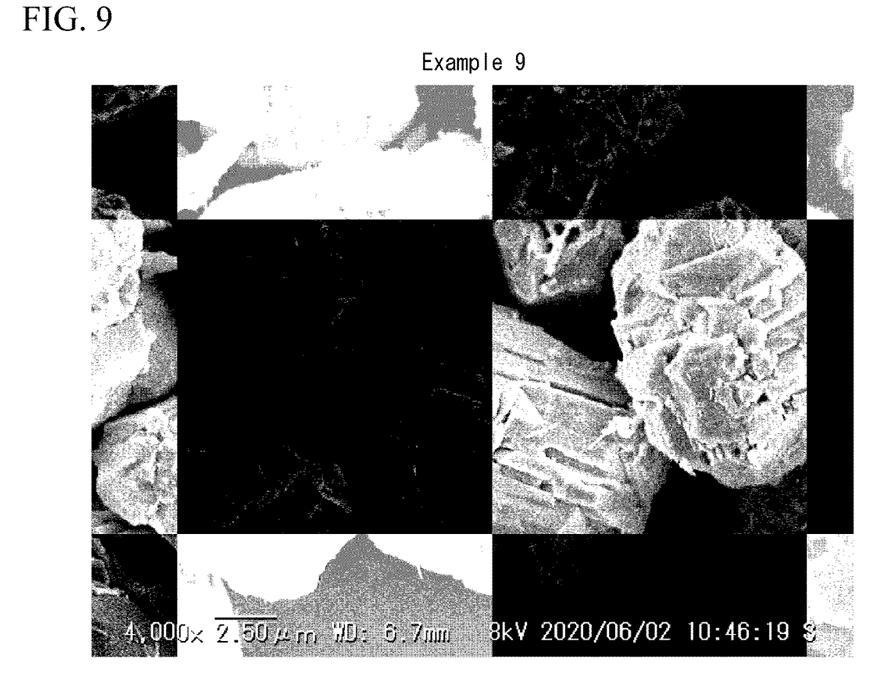
FIG. 9 is a SEM image of zirconia particles of Example 9.
Figure 10:
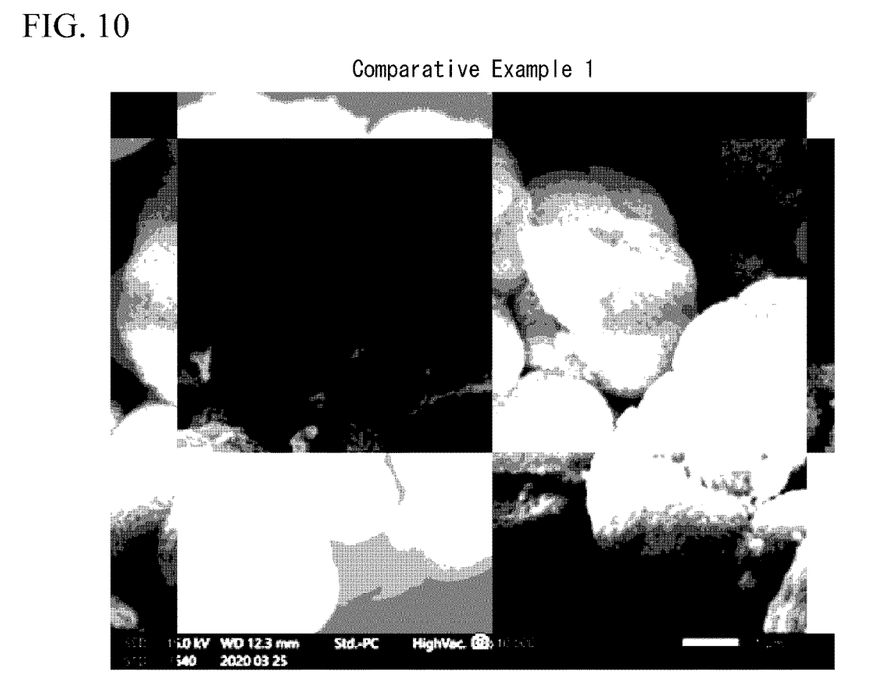
FIG. 10 is a SEM image of zirconia particles of Comparative Example 1.

Commercial zirconium oxide (reagent available from Kanto Chemical Co., Inc., $ZrO_2$, purity: 99.0% or higher) was used as zirconia particles of Comparative Example 1. The SEM image of the zirconia particles of Comparative Example 1 is shown in FIG. 9. The zirconia particles of Comparative Example 1 were amorphous aggregated fused particles.

Comparative Example 2

[Production of Zirconia Particles] Commercial zirconium oxide (reagent available from Kanto Chemical Co., Inc., $ZrO_2$, purity: 99.0% or higher) (10.0 g) was placed in a crucible and fired in a heating furnace SC-2045D-SP (available from Motoyama Co., Ltd.) at a heating rate of about 5° C./min from room temperature to 1100° C. and at 1100° C. for 10 hours. After temperature drop, the crucible was taken out, and 10 g of white powder was obtained.

Figure 11:
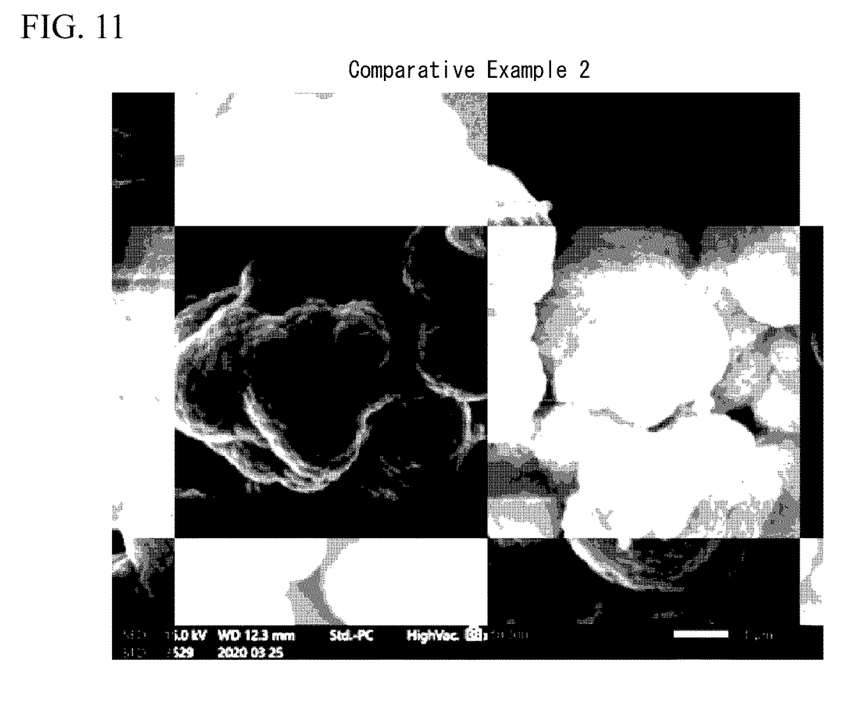
FIG. 11 is a SEM image of zirconia particles of Comparative Example 2.

The SEM image of the zirconia particles of Comparative Example 2 corresponding to the obtained white powder is shown in FIG. 11. The SEM image indicates that the zirconia particles of Comparative Example 2 have a larger particle size than the zirconia particles of Comparative Example 1 due to crystal growth. The zirconia particles of Comparative Example 2 are aggregated because of low dispersibility. The zirconia particles of Comparative Example 2 remain amorphous.

Example 1

[Production of Zirconia Particles]
In a mortar, 9.5 g of commercial zirconium oxide (reagent available from Kanto Chemical Co., Inc., $ZrO_2$, purity: 99.0% or higher) and 0.5 g of molybdenum trioxide ($MoO_3$, available from Nippon Inorganic Colour & Chemical Co., Ltd.) were mixed to provide a mixture. The obtained mixture was placed in a crucible and fired in a ceramic electric furnace at 1100° C. for 10 hours. After temperature drop, the crucible was taken out, and 9.5 g of white powder was obtained.

Subsequently, 9.0 g of the obtained white powder was suspended in 300 ml of 0.5% ammonia water, and the slurry was stirred at room temperature (25° C. to 30° C.) for 3 hours, followed by separation through microfiltration and further washing with water and drying, whereby molybdenum oxide remaining on the surfaces of the particles was removed to provide 8.7 g of a white powder of zirconia particles of Example 1.

Figure 1:
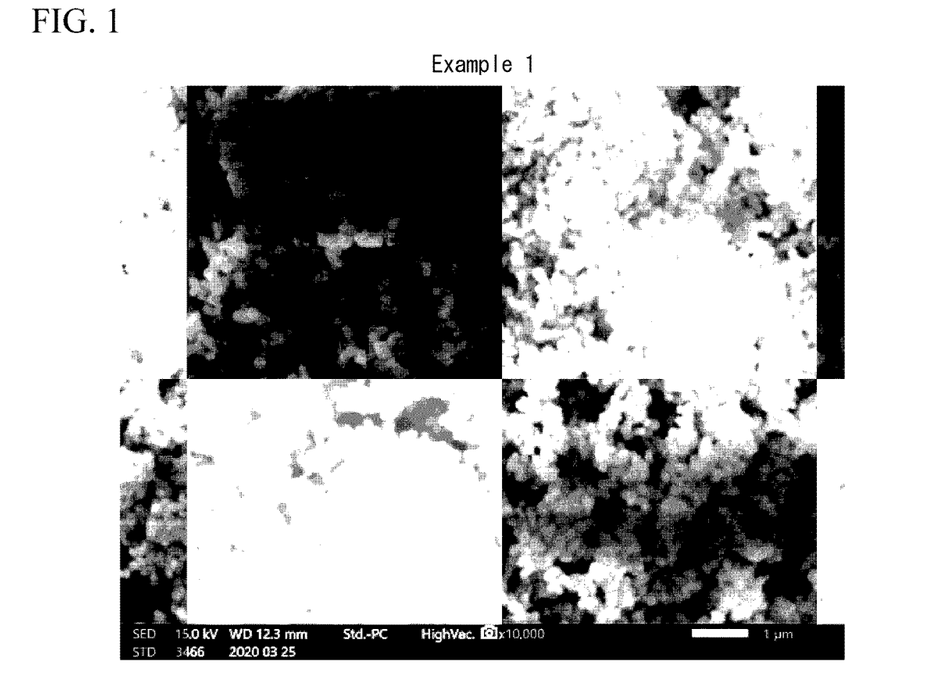
FIG. 1 is a SEM image of zirconia particles of Example 1.

The scanning electron microscope (SEM) image of the obtained zirconia particles of Example 1 is shown in FIG. 1. The zirconia particles of Example 1 each have a polyhedron shape, are not noticeably aggregated, and thus have better dispersibility than the zirconia particles of Comparative Examples 1 and 2.

Example 2

[Production of Zirconia Particles]
Firing was performed in the same manner as in Example 1 except that the amounts of raw material reagents in Example 1 were changed to 9.0 g of zirconium oxide (reagent available from Kanto Chemical Co., Inc., $ZrO_2$, purity: 99.0% or higher) and 1.0 g of molybdenum trioxide ($MoO_3$, available from Nippon Inorganic Colour & Chemical Co., Ltd.). The obtained powder was washed in the same manner as in Example 1 to provide a white powder of zirconia particles of Example 2.

Figure 2A:
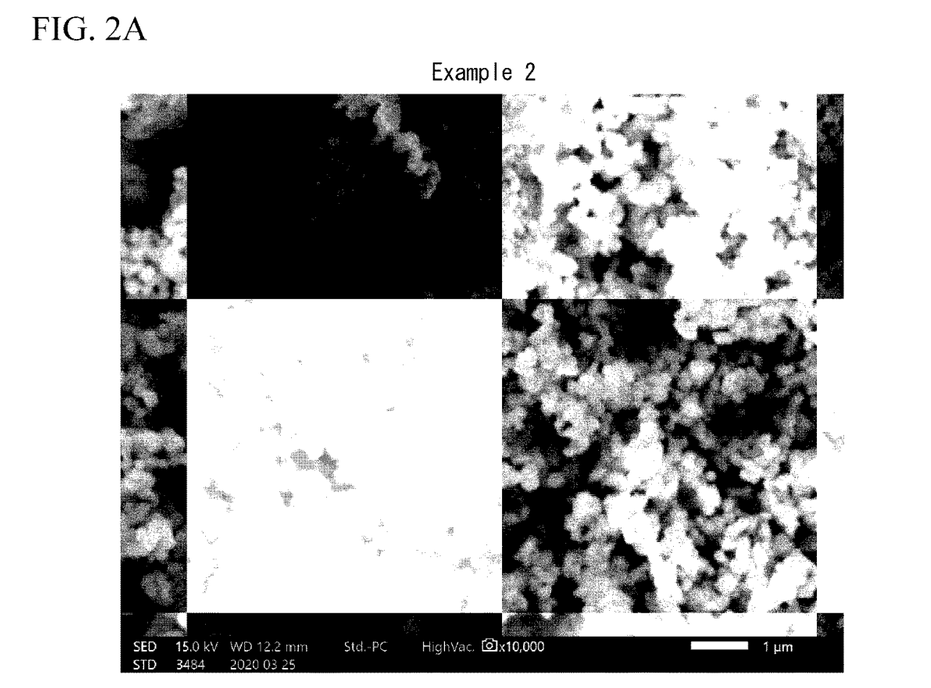
FIG. 2A is a SEM image of zirconia particles of Example 2.
Figure 2B:
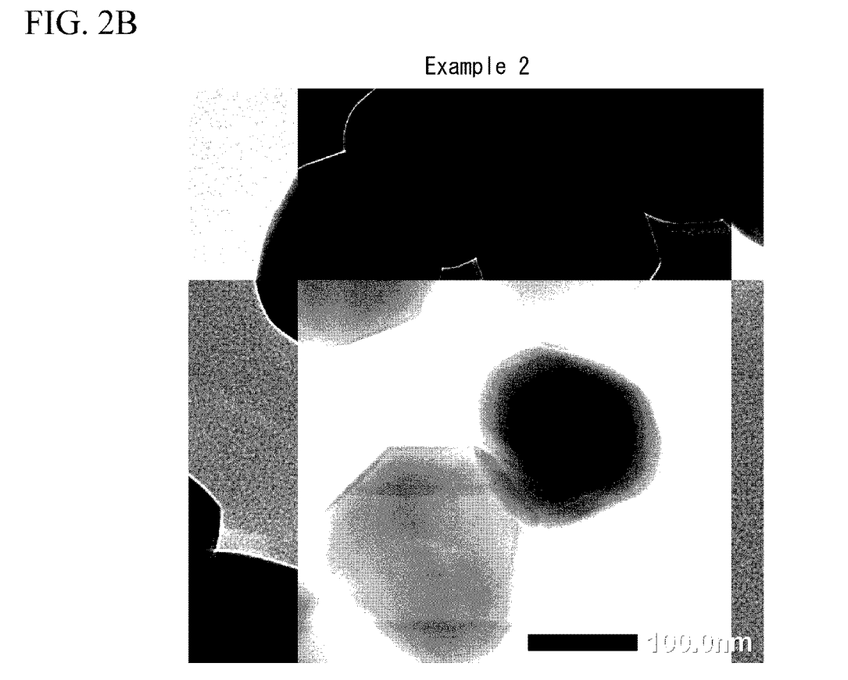
FIG. 2B is a TEM image of the zirconia particles of Example 2.
Figure 2C:
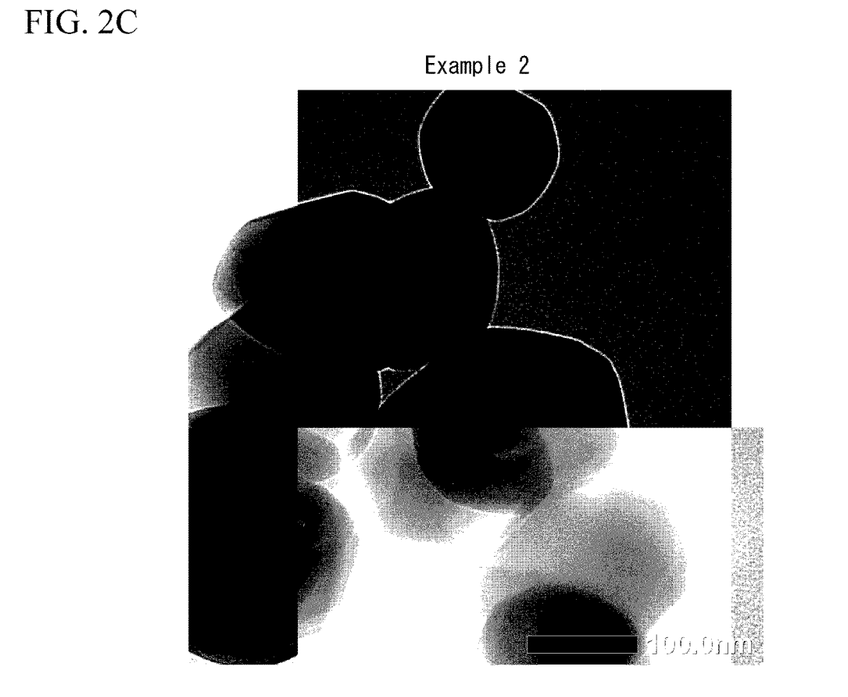
FIG. 2C is a TEM image of the zirconia particles of Example 2.

The scanning electron microscope (SEM) image of the obtained zirconia particles of Example 2 is shown in FIG. 2A, and the transmission electron microscope (TEM) images are shown in FIG. 2B and FIG. 2C. The zirconia particles of Example 2 each have a polyhedron shape, are not noticeably aggregated, and thus have better dispersibility than the zirconia particles of Comparative Examples 1 and 2.

Example 3

[Production of Zirconia Particles]
Firing was performed in the same manner as in Example 1 except that the amounts of raw material reagents in Example 1 were changed to 8.0 g of zirconium oxide (reagent available from Kanto Chemical Co., Inc., $ZrO_2$, purity: 99.0% or higher) and 2.0 g of molybdenum trioxide ($MoO_3$, available from Nippon Inorganic Colour & Chemical Co., Ltd.). The obtained powder was washed in the same manner as in Example 1 to provide a white powder of zirconia particles of Example 3.

Figure 3:
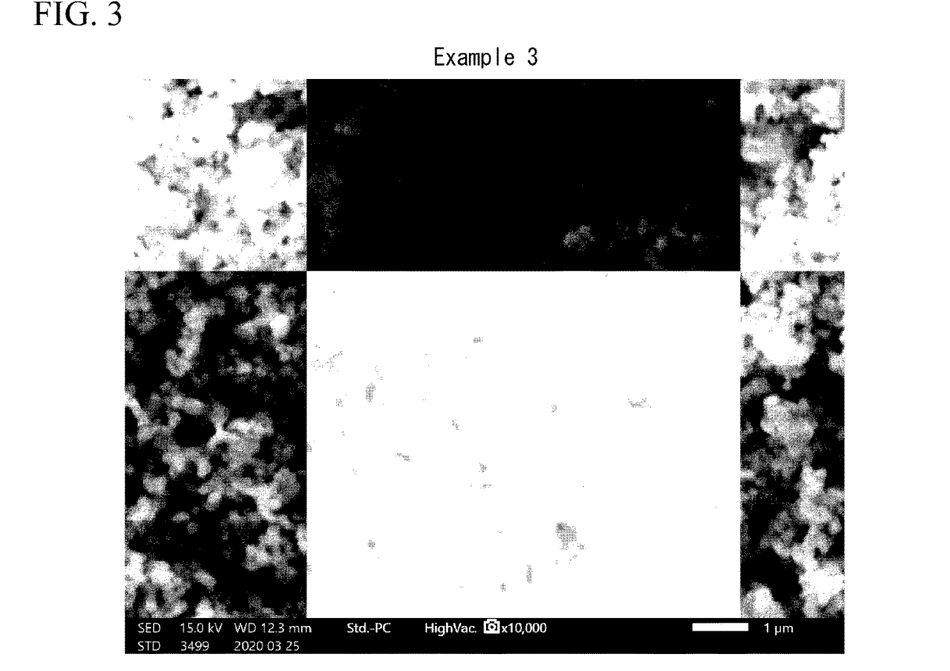
FIG. 3 is a SEM image of zirconia particles of Example 3.

The SEM image of the obtained zirconia particles of Example 3 is shown in FIG. 3. The zirconia particles of Example 3 each have a polyhedron shape, are not noticeably aggregated, and thus have better dispersibility than the zirconia particles of Comparative Examples 1 and 2.

Example 4

[Production of Zirconia Particles]
Firing was performed in the same manner as in Example 1 except that the amounts of raw material reagents in Example 1 were changed to 10.0 g of zirconium oxide (reagent available from Kanto Chemical Co., Inc., $ZrO_2$, purity: 99.0% or higher) and 10.0 g of molybdenum trioxide (MoO$_3$, available from Nippon Inorganic Colour & Chemical Co., Ltd.). The obtained powder was washed in the same manner as in Example 1 to provide a white powder of zirconia particles of Example 4.

Figure 4:
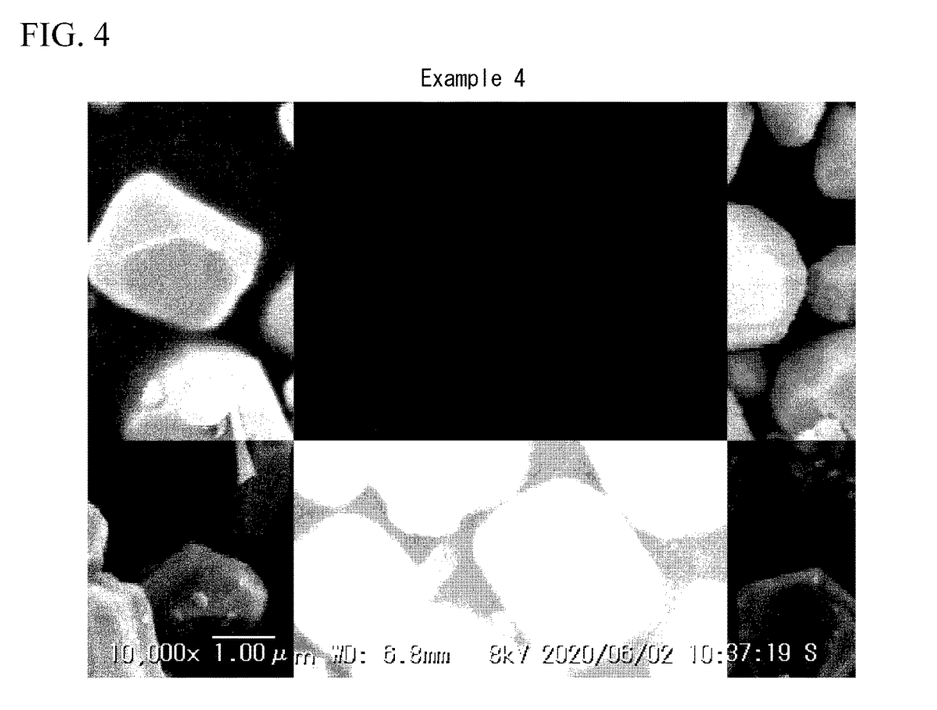
FIG. 4 is a SEM image of zirconia particles of Example 4.

The SEM image of the obtained zirconia particles of Example 4 is shown in FIG. 4. Zirconia particles each having a polyhedron shape were observed. The zirconia particles of Example 4 each have a polyhedron shape, are not noticeably aggregated, and thus have better dispersibility than the zirconia particles of Comparative Examples 1 and 2.

Example 5

[Production of Zirconia Particles] In a mortar, 10.0 g of zirconium oxide (reagent available from Kanto Chemical Co., Inc., ZrO$_2$, purity: 99.0% or higher) and 12 g of sodium molybdate dihydrate (Na$_2$MoO$_4$·2H$_2$O, available from Kanto Chemical Co., Inc.) were mixed to form a mixture. The obtained mixture was placed in a crucible and fired in a ceramic electric furnace at 1100° C. for 10 hours. After temperature drop, the crucible was taken out, and 20 g of white powder was obtained.

Subsequently, the obtained white solid was lightly crushed in a mortar and suspended in 300 ml of water, and the slurry was stirred at room temperature (25° C. to 30° C.) for 3 hours, followed by separation through microfiltration and further washing with water and drying, whereby lithium molybdate was removed to provide 9.4 g of a white powder of zirconia particles.

Figure 5:
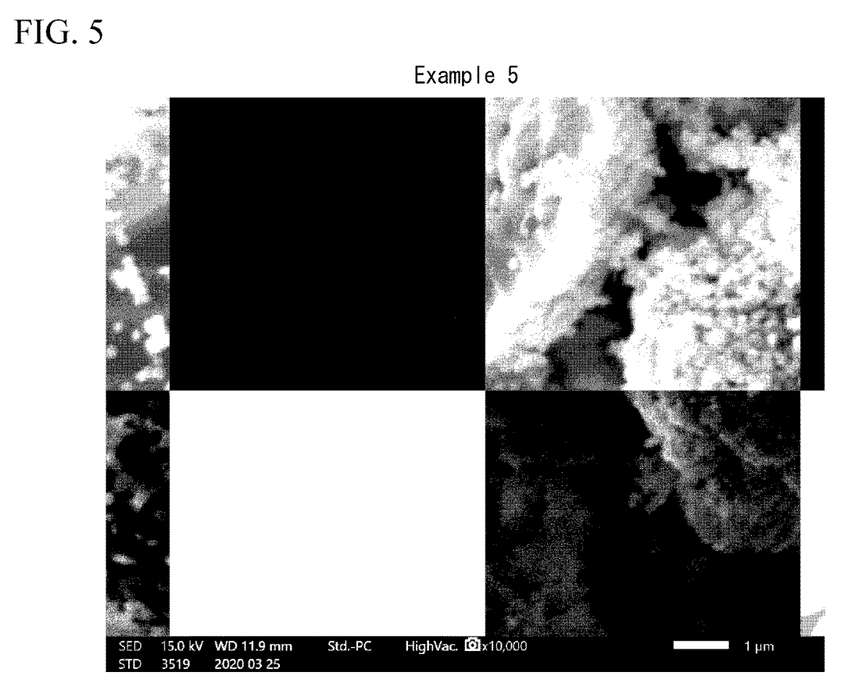
FIG. 5 is a SEM image of zirconia particles of Example 5.

The SEM image of the obtained zirconia particles of Example 5 is shown in FIG. 5. The zirconia particles of Example 5 each have a polyhedron shape, are not noticeably aggregated, and thus have better dispersibility than the zirconia particles of Comparative Examples 1 and 2.

Example 6

[Production of Zirconia Particles]

Firing was performed in the same manner as in Example 5 except that 12 g of sodium molybdate dihydrate was changed to 10 g of potassium molybdate (K$_2$MoO$_4$, available from Kanto Chemical Co., Inc.). The obtained powder was washed in the same manner as in Example 5 to provide a white powder of zirconia particles.

Figure 6:
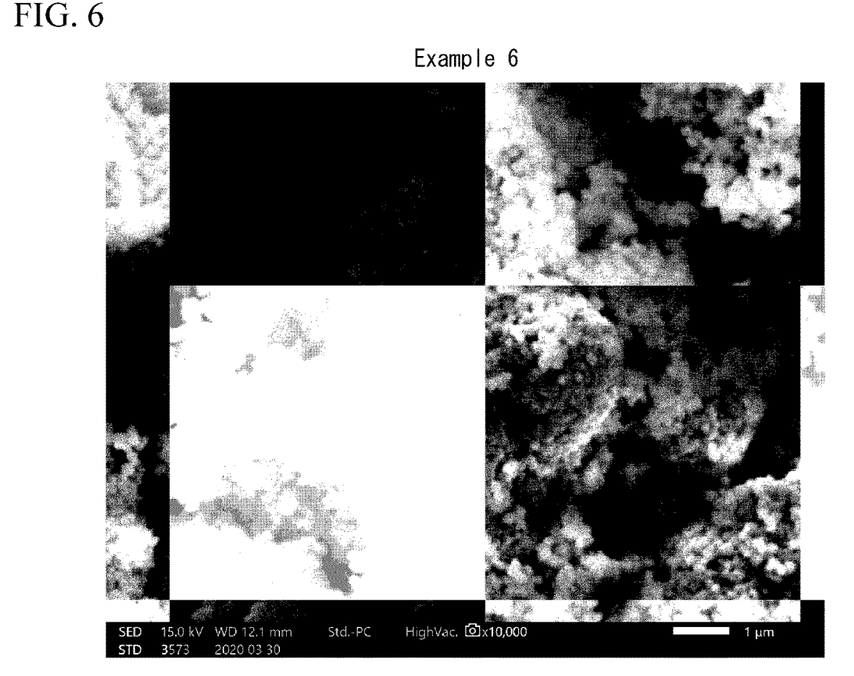
FIG. 6 is a SEM image of zirconia particles of Example 6.

The SEM image of the obtained zirconia particles of Example 6 is shown in FIG. 6. The zirconia particles of Example 6 each have a polyhedron shape, are not noticeably aggregated, and thus have better dispersibility than the zirconia particles of Comparative Examples 1 and 2.

Example 7

[Production of Zirconia Particles]

Firing was performed in the same manner as in Example 3 except that firing at 1100° C. for 10 hours was changed to firing at 900° C. for 10 hours. The obtained powder was washed in the same manner as in Example 3 to provide a white powder of zirconia particles.

Figure 7:
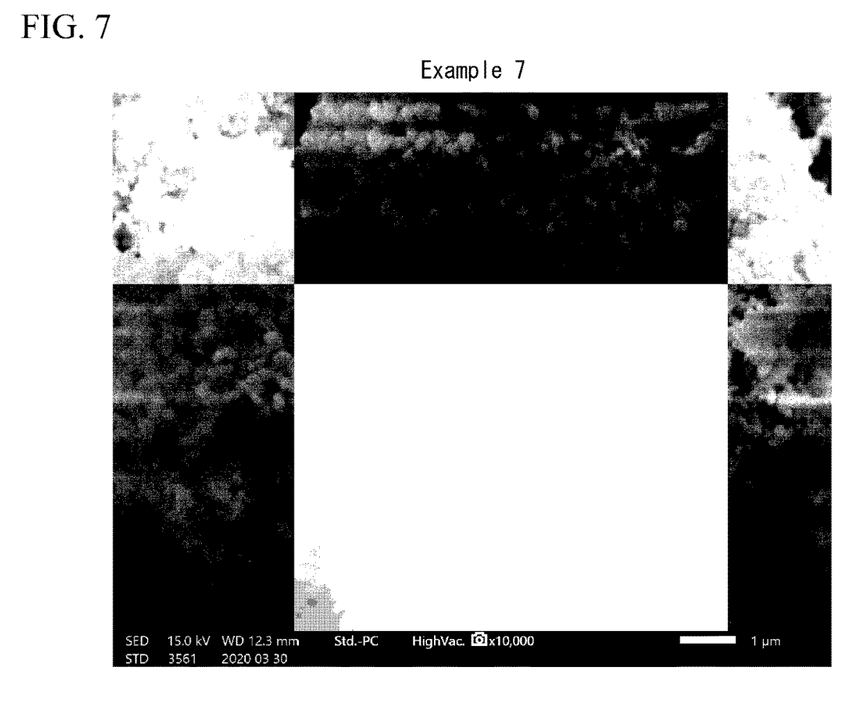
FIG. 7 is a SEM image of zirconia particles of Example 7.

The SEM image of the obtained zirconia particles of Example 7 is shown in FIG. 7. The zirconia particles of Example 7 each have a polyhedron shape, are not noticeably aggregated, and thus have better dispersibility than the zirconia particles of Comparative Examples 1 and 2.

Example 8

[Production of Zirconia Particles]

Firing was performed in the same manner as in Example 5 except that firing at 1100° C. for 10 hours was changed to firing at 1300° C. for 24 hours. The obtained powder was washed in the same manner as in Example 5 to provide a white powder of zirconia particles.

Figure 8:
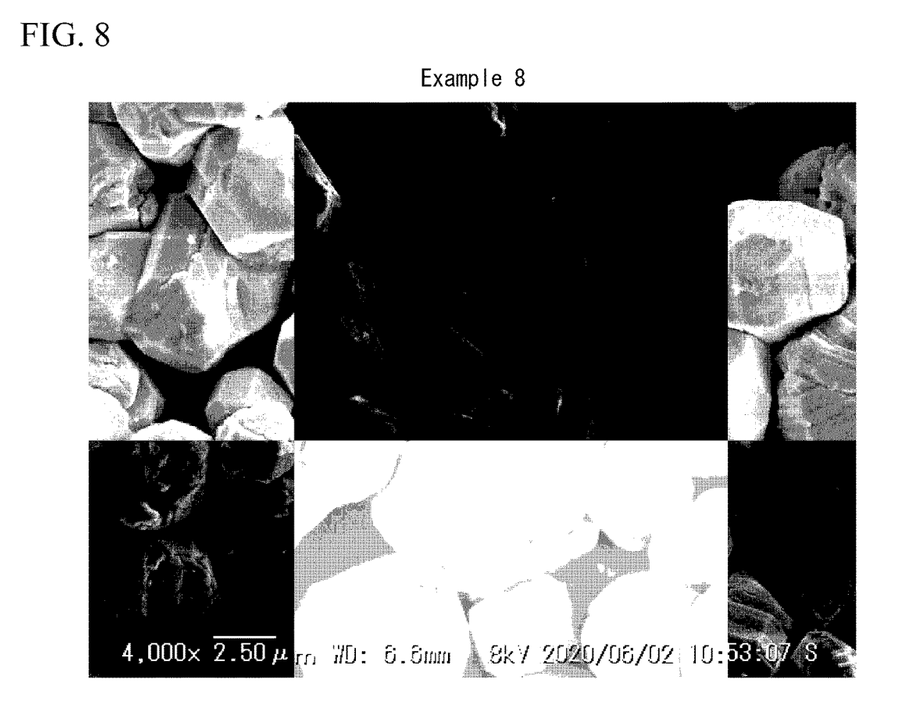
FIG. 8 is a SEM image of zirconia particles of Example 8.

The SEM image of the obtained zirconia particles of Example 8 is shown in FIG. 8. The zirconia particles of Example 8 each have a polyhedron shape, are not noticeably aggregated, and thus have better dispersibility than the zirconia particles of Comparative Examples 1 and 2.

Example 9

[Production of Zirconia Particles]

Firing was performed in the same manner as in Example 8 except that 12 g of sodium molybdate dihydrate was changed to 12 g of potassium molybdate (K$_2$Mo$_2$O$_7$, available from Kanto Chemical Co., Inc.). The obtained powder was washed in the same manner as in Example 8 to provide a white powder of zirconia particles.

The SEM image of the obtained zirconia particles of Example 9 is shown in FIG. 9. The zirconia particles of Example 9 each have a polyhedron shape, are not noticeably aggregated, and thus have better dispersibility than the zirconia particles of Comparative Examples 1 and 2.

TABLE 1

| | ZrO$_2$ | | MoO$_3$ | | K$_2$MoO$_4$ | | K$_2$Mo$_2$O$_7$ | | Na$_2$MoO$_4$·2H$_2$O | | Maximum Firing Temperature | Firing Time |
|---|---|---|---|---|---|---|---|---|---|---|---|---|
| | g | mass % | g | mass % | g | mass % | g | mass % | g | mass % | ° C. | h |
| Comparative Example 1 | — | 100.0 | | | | | | | | | — | — |
| Comparative Example 2 | 8.0 | 80.0 | 2.0 | 20.0 | | | | | | | 1100.0 | 10 |
| Example 1 | 9.5 | 95.0 | 0.5 | 5.0 | | | | | | | | |
| Example 2 | 9.0 | 90.0 | 1.0 | 10.0 | | | | | | | | |
| Example 3 | 8.0 | 80.0 | 2.0 | 20.0 | | | | | | | | |
| Example 4 | 10.0 | 50.0 | 10.0 | 50.0 | | | | | | | | |
| Example 5 | 10.0 | 45.5 | | | | | | | 12.0 | 54.5 | | |
| Example 6 | 10.0 | 50.0 | | | 10.0 | 50.0 | | | | | | |
| Example 7 | 8.0 | 80.0 | 2.0 | 20.0 | | | | | | | 900.0 | 10 |
| Example 8 | 10.0 | 45.5 | | | | | | | 12.0 | 54.5 | 1300.0 | 24 |
| Example 9 | 10.0 | 45.5 | | | | | 12.0 | 54.5 | | | | |

[Measurement of Average Particle Size of Primary Particles of Zirconia Particles]

The zirconia particles were captured with a scanning electron microscope (SEM). The major diameter (the maximum Feret diameter observed) and the miner diameter (short Feret diameter perpendicular to the maximum Feret diameter) of each of minimum unit particles (i.e., primary particles) that form aggregates on the two-dimensional image were measured, and the average value of the major diameter and the miner diameter was defined as a primary particle size. The same measurement was carried out on 50 primary particles whose major diameter and miner diameter can be measured. From the average primary particle size of these primary particles, the average particle size of the primary particles was calculated. The results are shown in Table 2.

[Measurement of Crystallite Size]

Powder X-ray diffraction (2θ/θ method) was performed under the following measurement conditions using an X-ray diffractometer (SmartLab available from Rigaku Corporation) equipped with a high-intensity high-resolution crystal analyzer (CALSA) (available from Rigaku Corporation) as a detector. Analysis was performed using the CALSA function of analysis software (PDXL) available from Rigaku Corporation. The [11-1] plane crystallite size was calculated using the Scherrer equation from the full width at half maximum of a peak around 2θ=28.2°, and the plane crystallite size was calculated using the Scherrer equation from the full width at half maximum of a peak around 2θ=31.5°. The results are shown in Table 2.

[Measurement Conditions of Powder X-Ray Diffraction Method]

Tube voltage: 45 kV
Tube current: 200 mA
Scan speed: 0.05°/min
Scan range: 10° to 70°
Step: 0.002°
βs: 20 rpm
Apparatus standard width: 0.026° calculated using standard silicon powder (NIST, 640d) distributed by National Institute of Standards and Technology.

[Crystal Structure Analysis: X-Ray Diffraction (XRD) Method]

Figure 12:
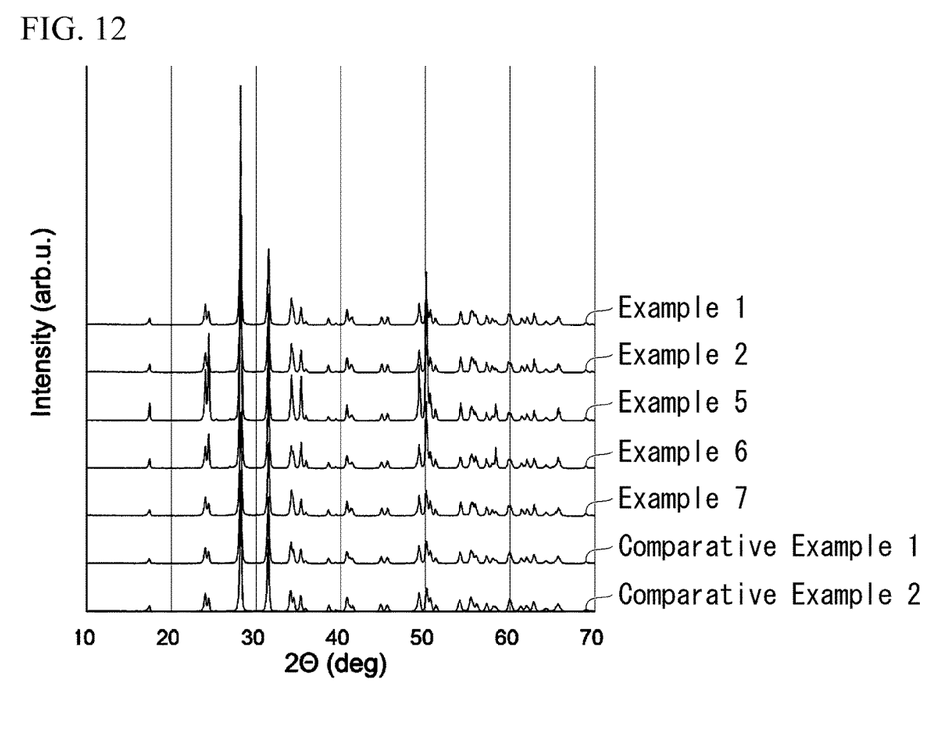
FIG. 12 is a graph showing the results of XRD analysis of the zirconia particles of Examples and Comparative Examples.

A sample of the zirconia particles of any of Examples 1 to 2, 5 to 7, and 10 and Comparative Examples 1 to 2 was charged into a sample holder with a depth of 0.5 mm and set in a wide-angle X-ray diffraction (XRD) system (Ultima IV available from Rigaku Corporation). The measurement was performed under the conditions of Cu/Kα ray, 40 kV/40 mA, a scan speed of 2°/min, and a scan range of 10° to 70°. The results of XRD analysis of the zirconia particles of Examples 1 to 2 and 5 to 7 and Comparative Examples 1 to 2 are shown in FIG. 12.

Figure 13:
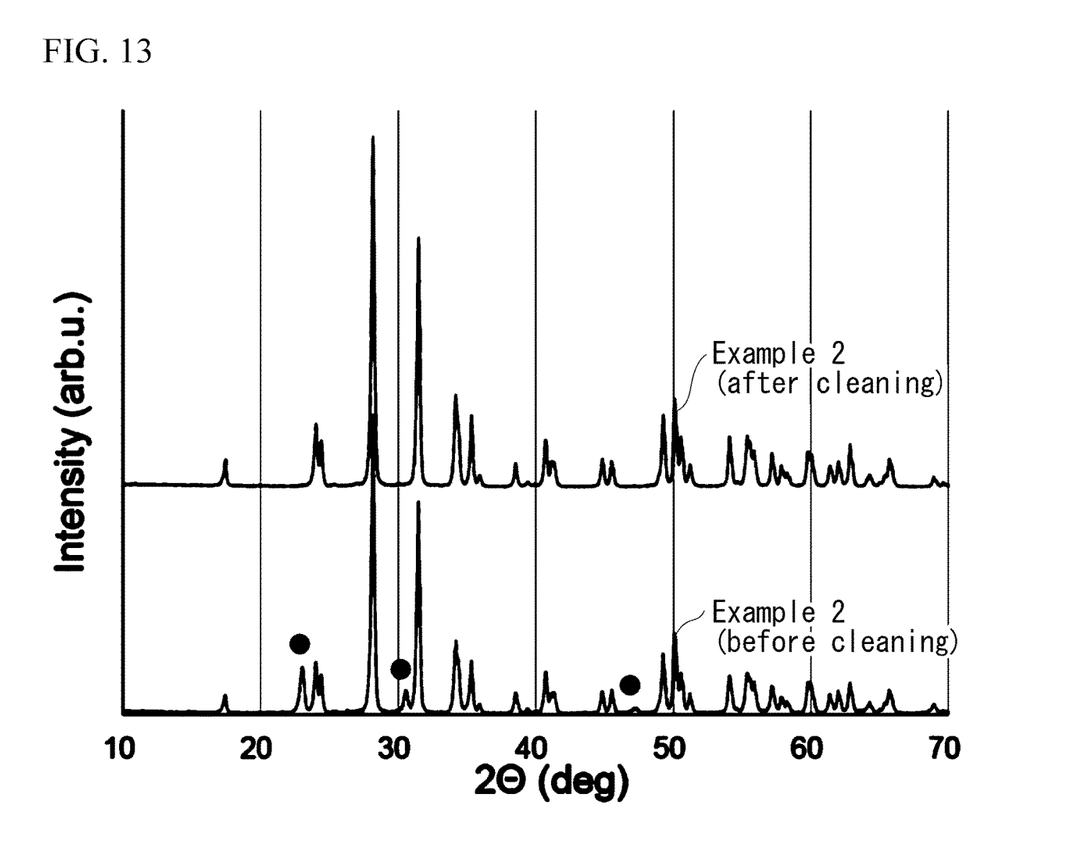
FIG. 13 is a graph showing the results of XRD analysis of the zirconia particles of Example 2 before washing and after washing.

The results of XRD analysis of the zirconia particles of Example 2 before washing and after washing are shown in FIG. 13.

The peaks marked with • are from zirconium molybdate Zr (MoO$_4$)$_2$.

FIG. 13 indicates that zirconium molybdate Zr(MoO$_4$)$_2$ detected before washing was removed by washing.

The crystal peak of the [11-1] plane of baddeleyite (ZrO$_2$) was observed around 2θ=28.2°, and the crystal peak of the plane of baddeleyite (ZrO$_2$) was observed around 2θ=31.5°. In other words, the patterns of these crystal peaks indicate that the zirconia particles have a crystal structure of baddeleyite (ZrO$_2$).

[Measurement of Particle Size Distribution of Zirconia Particles]

The particle size distribution of zirconia particle samples was measured by a dry method using a laser diffraction dry particle size distribution analyzer (HELOS (H3355) & RODOS available from Japan Laser Corporation) under the conditions of a dispersion pressure of 3 bar and a suction pressure of 90 mbar, and the particle size at a point where the distribution curve of cumulative volume % intersects the horizontal axis at 50% was obtained as the median diameter $D_{50}$. The results are shown in Table 2.

[Measurement of Isoelectric Point of Zirconia Particles]

The zeta potential of the zirconia particles was measured by using a zeta potential analyzer (Zetasizer Nano ZSP, Malvern Panalytical Ltd). In a THINKY mixer (ARE-310, Thinky Corporation), 20 mg of the sample and 10 mL of 10 mM KCl aqueous solution were mixed in a mixing/deaeration mode for 3 minutes. After the mixture was left to stand for 5 minutes, the supernatant was used as a sample for measurement. To the sample, 0.1 N HCl was added by using an automatic titrator, and the zeta potential was measured (applied voltage 100 V, Monomodal mode) until pH=2, and the pH of the isoelectric point where the potential was zero was determined. The results are shown in Table 2.

[Measurement of Specific Surface Area of Zirconia Particles]

The specific surface area of the zirconia particles was measured by using a surface area analyzer (BELSORP-mini available from MicrotracBEL Corporation), and the surface area per gram of the sample measured from the amount of absorbed nitrogen gas by the BET method was calculated as the specific surface area (m$^2$/g). The results are shown in Table 2.

[Measurement of Purity of Zirconia Particles: X-Ray Fluorescence (XRF) Analysis]

About 70 mg of a sample of the zirconia particles was placed on filter paper, covered with a PP film, and subjected to X-ray fluorescence (XRF) analysis under the following conditions using an X-ray fluorescence spectrometer Primus IV (available from Rigaku Corporation).

Measurement Conditions
EZ scan mode
Elements of interest: F to U
Measurement time: standard
Measurement diameter: 10 mm
Remainder (balance): none The results of the ZrO$_2$ content ($Z_1$) based on 100 mass % of the zirconia particles and the MoO$_3$ content ($M_1$) based on 100 mass % of the zirconia particles determined by XRF analysis are shown in Table 2.

[XPS Surface Analysis]

The surface elemental analysis of the zirconia particles was carried out by X-ray photoelectron spectroscopy (XPS) using Quantera SXM (available from ULVAC-PHI, Inc.) equipped with a monochromatic Al Kα X-ray source. The average atomic percentage (atom %) of each element was obtained by measurement (n=3) of an area of 1000 μm square. For ease in comparison with the XRF results, the zirconium content of the surface layers of the zirconia particles and the molybdenum content of the surface layers were converted into oxide contents to obtain the ZrO$_2$ content ($Z_2$) (mass %) based on 100 mass % of the surface layers of the zirconia particles and the MoO$_3$ content ($M_2$) (mass %) based on 100 mass % of the surface layers of the zirconia particles. The results are shown in Table 2.

The surface uneven distribution ratio ($M_2/M_1$) of the MoO$_3$ content ($M_2$) based on 100 mass % of the surface layers of the zirconia particles as determined by XPS surface analysis of the zirconia particles to the MoO$_3$ content ($M_1$) based on 100 mass % of the zirconia particles as determined by XRF analysis of the zirconia particles was calculated. The results are shown in Table 2.

TABLE 2

| | SEM | | Crystallite Size | | Particle Size Distribution | | | |
| --- | --- | --- | --- | --- | --- | --- | --- | --- |
| | | | [11-1] plane 28.2° | [111] plane 31.5° | | [11-1] plane | | Isoelectric Point |
| | shape | average particle size μm | nm | nm | $D_{50}$ μm | crystallite size/average particle size — | [11-1] plane crystallite size/$D_{50}$ — | pH — |
| Comparative Example 1 | amorphous | 10.00 | 76 | 74 | 11.6 | 0.01 | 0.01 | 7.1 |
| Comparative Example 2 | amorphous | 10.00 | 81 | 73 | 9.8 | 0.01 | 0.01 | 7.1 |
| Example 1 | polyhedron | 0.15 | — | — | 2.4 | — | — | 6.4 |
| Example 2 | polyhedron | 0.20 | 129 | 130 | 0.8 | 0.65 | 0.16 | 6.3 |
| Example 3 | polyhedron | 0.20 | — | — | 1.4 | — | — | 6.5 |
| Example 4 | polyhedron | 2.50 | 247 | 237 | 4.8 | 0.10 | 0.05 | 3.8 |
| Example 5 | polyhedron | 1.56 | 183 | 176 | 10.2 | 0.12 | 0.02 | 4.2 |
| Example 6 | polyhedron | 0.15 | 100 | 104 | 8.0 | 0.67 | 0.01 | 4.5 |
| Example 7 | polyhedron | 0.20 | — | — | 2.0 | — | — | 6.3 |
| Example 8 | polyhedron | 5.00 | 174 | 148 | 8.6 | 0.03 | 0.02 | 4.5 |
| Example 9 | polyhedron | 10.00 | 101 | 98 | 14.6 | 0.01 | 0.01 | 4.5 |

| | Specific Surface Area | XRF Analysis | | XPS Surface Analysis | | Surface Uneven Distribution Ratio |
| --- | --- | --- | --- | --- | --- | --- |
| | (BET method) $m^2/g$ | $ZrO_2$ ($Z_1$) mass % | $MoO_3$ ($M_1$) mass % | $ZrO_2$ ($Z_2$) mass % | $MpO_3$ ($M_2$) mass % | $MoO_3$ ($M_2/M_1$) — |
| Comparative Example 1 | 0.04 | 98.4 | ND | 96.9 | ND | ND |
| Comparative Example 2 | 0.02 | 98.2 | ND | 96.9 | ND | ND |
| Example 1 | 6.5 | 97.9 | 0.4 | 91.2 | 2.4 | 6.0 |
| Example 2 | 4.8 | 97.0 | 0.5 | 80.1 | 4.8 | 9.6 |
| Example 3 | 4.9 | 97.7 | 0.3 | 90.4 | 2.4 | 8.0 |
| Example 4 | 0.4 | 94.5 | 2.4 | 37.5 | 30.4 | 12.7 |
| Example 5 | 1.0 | 97.9 | 0.1 | 88.5 | 6.8 | 68.0 |
| Example 6 | 6.3 | 97.7 | 0.4 | 88.9 | 7.6 | 19.0 |
| Example 7 | 4.8 | 97.3 | 0.6 | 87.7 | 3.6 | 6.0 |
| Example 8 | 0.02 | 98.0 | 0.1 | 88.5 | 6.4 | 64.0 |
| Example 9 | 0.01 | 98.0 | 0.3 | 88.6 | 7.5 | 25.0 |

In the zirconia particles of Examples 1 to 9, the uneven distribution of molybdenum in the surface layers of the zirconia particles was confirmed on the basis of the $MoO_3$ content ($M_2$) based on 100 mass % of the surface layers of the zirconia particles as determined by XPS surface analysis of the zirconia particles being larger than the $MoO_3$ content ($M_1$) based on 100 mass % of the zirconia particles as determined by XRF analysis of the zirconia particles.

Since the zirconia particles of Examples 1 to 9 have an isoelectric point at more acidic pH than existing zirconia particles, the zirconia particles of Examples 1 to 9 have high electrostatic repulsion and good dispersion stability.

The zirconia particles of Examples 1 to 9 have molybdenum unevenly distributed in their surface layers unlike existing zirconia particles and have a relatively larger crystallite size than existing zirconia particles.

[Evaluation of Dispersibility in Liquid]

The dispersibility in liquid was evaluated in the following manner.

(1) To 10 g of pure water, 20 mg of 35% hydrochloric acid and 0.1 g of a sample of the zirconia particles were added.
(2) The mixture was shaken by the hand for 30 seconds and then left to stand for 5 hours.
(3) After the mixture was left to stand for 5 hours, the appearance was observed to evaluate the dispersibility in liquid on the basis of the following criteria.

A: A clear supernatant is hardly observed.
B: A clear portion is present in a liquid upper part.
C: The liquid is clear because almost all particles settle.

The results of the evaluation of dispersibility in liquid are shown in Table 3.

TABLE 3

| | Example 1 | Example 2 | Example 5 | Example 6 | Example 7 | Comparative Example 1 | Comparative Example 2 |
| --- | --- | --- | --- | --- | --- | --- | --- |
| Results | A | A | B | B | A | C | C |

Since the zirconia particles of Examples have molybdenum unevenly distributed in their surface layers, the zirconia particles of Examples have better dispersibility in liquid than the zirconia particles of Comparative Examples.

INDUSTRIAL APPLICABILITY

The zirconia particles according to the present invention are expected to be used as a ceramic raw material for electrolytes in fuel cell applications, catalysts, cutting tool parts, as a white pigment without photocatalytic activity, or as a thermal insulating material for electric furnaces and rockets.

The invention claimed is:

1. Zirconia particles comprising molybdenum and each of the zirconia particles having a polyhedron shape, wherein the zirconia particles have a [11-1] plane crystallite size of 90 nm or more,
wherein a surface uneven distribution ratio (M2/M1) of a $MoO_3$ content (M2) based on 100 mass % of surface layers of the zirconia particles as determined by XPS surface analysis of the zirconia particles to a $MoO_3$ content (M1) based on 100 mass % of the zirconia particles as determined by XRF analysis of the zirconia particles is from 2 to 80.

2. The zirconia particles according to claim 1, wherein the zirconia particles have a median diameter D50 of 0.1 to 1000 μm as calculated by a laser diffraction/scattering method.

3. The zirconia particles according to claim 1, wherein the zirconia particles have a $ZrO_2$ content (Z1) of 90.0 to 99.9 mass % based on 100 mass % of the zirconia particles as determined by XRF analysis of the zirconia particles and have a $MoO_3$ content (M1) of 0.1 to 5.0 mass % based on 100 mass % of the zirconia particles as determined by XRF analysis of the zirconia particles.

4. The zirconia particles according to claim 1, wherein the zirconia particles have a $ZrO_2$ content (Z2) of 35.0 to 98.0 mass % based on 100 mass % of surface layers of the zirconia particles as determined by XPS surface analysis of the zirconia particles and have a $MoO_3$ content (M2) of 2.0 to 40.0 mass % based on 100 mass % of the surface layers of the zirconia particles as determined by XPS surface analysis of the zirconia particles.

5. The zirconia particles according to claim 1, wherein the zirconia particles have an isoelectric point, where a potential is 0, at pH 2.0 to 6.5 as determined by zeta potential measurement.

6. The zirconia particles according to claim 1, wherein the zirconia particles have a specific surface area of 20 $m^2/g$ or less as determined by a BET method.

7. The zirconia particles according to claim 1, wherein the zirconia particles have a [111] plane crystallite size of 90 nm or more.

8. A method for producing the zirconia particles according to claim 1, the method comprising:
mixing a zirconium compound and a molybdenum compound to form a mixture; and
firing the mixture.

9. The method for producing the zirconia particles according to claim 8, wherein the molybdenum compound is molybdenum trioxide, lithium molybdate, potassium molybdate, or sodium molybdate.

10. The method for producing the zirconia particles according to claim 8, wherein a maximum firing temperature at which the mixture is fired is from 800° C. to 1600° C.

* * * * *